(12) United States Patent
Gruber et al.

(10) Patent No.: US 8,267,666 B2
(45) Date of Patent: Sep. 18, 2012

(54) AIR FLOW CONTROL APPARATUS

(75) Inventors: Christopher Gruber, Cincinnati, OH (US); David O. Shumate, Lawrenceburg, IN (US); James W. Happe, Jr., Cincinnati, OH (US); Steven R. Salmons, Saint Louis, MO (US); Jeffrey P. VanHorn, Saint Louis, MO (US)

(73) Assignee: Campbell Hausfeld/Scott Fetzer Company, Harrison, OH (US)

( * ) Notice: Subject to any disclaimer, the term of this patent is extended or adjusted under 35 U.S.C. 154(b) by 375 days.

(21) Appl. No.: 12/719,898

(22) Filed: Mar. 9, 2010

(65) Prior Publication Data

US 2011/0033313 A1 Feb. 10, 2011

Related U.S. Application Data

(60) Provisional application No. 61/231,759, filed on Aug. 6, 2009.

(51) Int. Cl.
*F04B 49/00* (2006.01)

(52) U.S. Cl. ..... 417/26; 137/223; 137/227; 137/630.22; 137/512.2; 137/118.06; 137/107; 417/44.2; 417/303

(58) Field of Classification Search .................... 417/26, 417/36, 38, 44.2, 302, 303; 137/226, 493.1, 137/493.2, 493.7–493.9, 630.22, 107, 223, 137/512.15, 119.08, 118.06, 512.2
See application file for complete search history.

(56) References Cited

U.S. PATENT DOCUMENTS

| | | | | |
|---|---|---|---|---|
| 1,699,378 A * | 1/1929 | Smith | ......................... | 137/226 |
| 2,391,551 A * | 12/1945 | Cruzan et al. | ............. | 137/115.01 |
| 2,392,213 A | 1/1946 | Cruzan | | |
| 2,392,214 A | 1/1946 | Cruzan | | |
| 3,295,450 A * | 1/1967 | Schonwald et al. | ............ | 417/43 |
| 3,933,171 A * | 1/1976 | Hay | ........................... | 137/493.7 |
| 4,320,622 A * | 3/1982 | Farr | ............................... | 60/418 |
| 4,406,589 A * | 9/1983 | Tsuchida et al. | ............... | 417/295 |
| 6,227,815 B1 * | 5/2001 | Chandra et al. | ............... | 417/298 |
| 6,772,790 B2 * | 8/2004 | Viebahn et al. | ............... | 137/592 |
| 6,866,062 B2 | 3/2005 | Lammers | | |
| 7,207,174 B2 * | 4/2007 | Montgomery et al. | ......... | 60/410 |
| 2006/0045752 A1 * | 3/2006 | Beckman | ..................... | 417/44.2 |

* cited by examiner

*Primary Examiner* — Devon C Kramer
*Assistant Examiner* — Ryan Gatzemeyer
(74) *Attorney, Agent, or Firm* — Jones Day

(57) ABSTRACT

An apparatus includes a valve housing having an inlet port, a first chamber with a first outlet port, and a second chamber with a second outlet port. A first valve opens between the inlet port and the first chamber under a first level of pneumatic pressure at the inlet port. A second valve opens between the first chamber and the second chamber under a second, greater level of pneumatic pressure in the first chamber. A third valve opens between the second chamber and the first chamber under a third level of pneumatic pressure in the second chamber, with the third level being less than the first level.

18 Claims, 3 Drawing Sheets

AIR FLOW CONTROL APPARATUS

RELATED APPLICATIONS

This application claims the benefit of provisional U.S. Patent Application 61/231,759, filed Aug. 6, 2009, which is incorporated by reference.

TECHNICAL FIELD

This technology relates to pneumatic devices that operate under compressed air stored in a tank.

BACKGROUND

Many pneumatic devices, such as an inflators, pressure washers, paint sprayers, and others, operate under compressed air that is stored in a tank. The tank is filled to an elevated storage pressure level that is greater than the pressure level needed for any particular application, such as inflating tires. This enables the user to draw compressed air from the tank as long as the storage pressure remains above the level needed by the user. The device typically has a control valve assembly for controlling the flow of air into and out of the tank.

SUMMARY OF THE INVENTION

An apparatus includes a valve housing having an inlet port, a first chamber with a first outlet port, and a second chamber with a second outlet port. A first valve opens a pneumatic flow path form the inlet port to the first chamber in response to a first level of pneumatic pressure at the inlet port. A second valve opens a pneumatic flow path from the first chamber to the second chamber in response to a second, greater level of pneumatic pressure in the first chamber. A third valve opens a pneumatic flow path from the second chamber to the first chamber in response to a third level of pneumatic pressure in the second chamber, with the third level being less than the first level.

Summarized differently, the apparatus includes a first spring-loaded check valve that opens between the inlet port and the first chamber under pneumatic pressure at the inlet port, a second spring-loaded check valve that opens between the first chamber and the second chamber under pneumatic pressure in the first chamber, and a flapper check valve that opens between the second chamber and the first chamber under pneumatic pressure in the second chamber.

A preferred embodiment includes a compressor, a tank, and a pneumatic output line. The inlet port at the valve housing receives compressed air from the compressor. The first outlet port provides compressed air to the output line, and the second outlet port provides compressed air to the tank. This embodiment also includes a sensor responsive to pneumatic pressure in the second chamber. A controller responds to the sensor by turning the compressor off if the pneumatic pressure in the second chamber reaches a fourth level greater than the second level.

DETAILED DESCRIPTION

Figure 1:
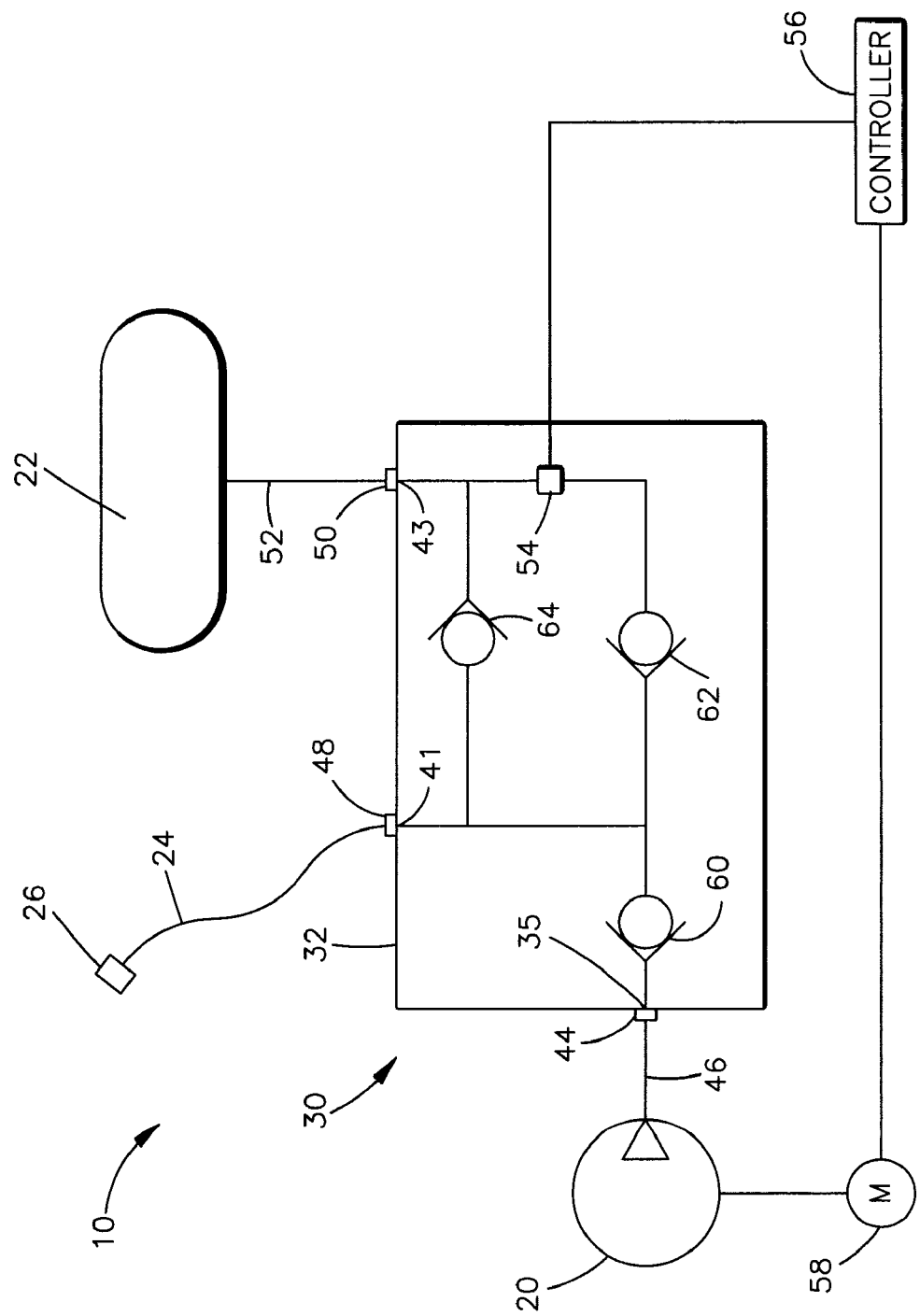
FIG. 1 is a schematic view of an apparatus including a valve assembly that is operative between a compressor, an output line, and a tank.

The apparatus 10 shown schematically in FIG. 1 includes a compressor 20, a tank 22, and a pneumatic output line 24. The compressor 20 is a source of compressed air, and the tank 22 serves as a reservoir for storing the compressed air. This particular example of a pneumatic output line 24 is a hose with a coupling 26 for engaging a tire valve stem, but is interchangeable with hoses or other output lines for delivering compressed air to other pneumatic devices such as, for example, paint sprayers, pressure washers, and the like.

The apparatus 10 further includes a control valve assembly 30 which is operatively coupled between the compressor 20, the tank 22 and the hose 24. In operation, the control valve assembly 30 enables a user to inflate tires with air from the hose 24 merely by turning the compressor 20 on, and without waiting for the compressor 20 to fill the tank 22.

Figure 2:
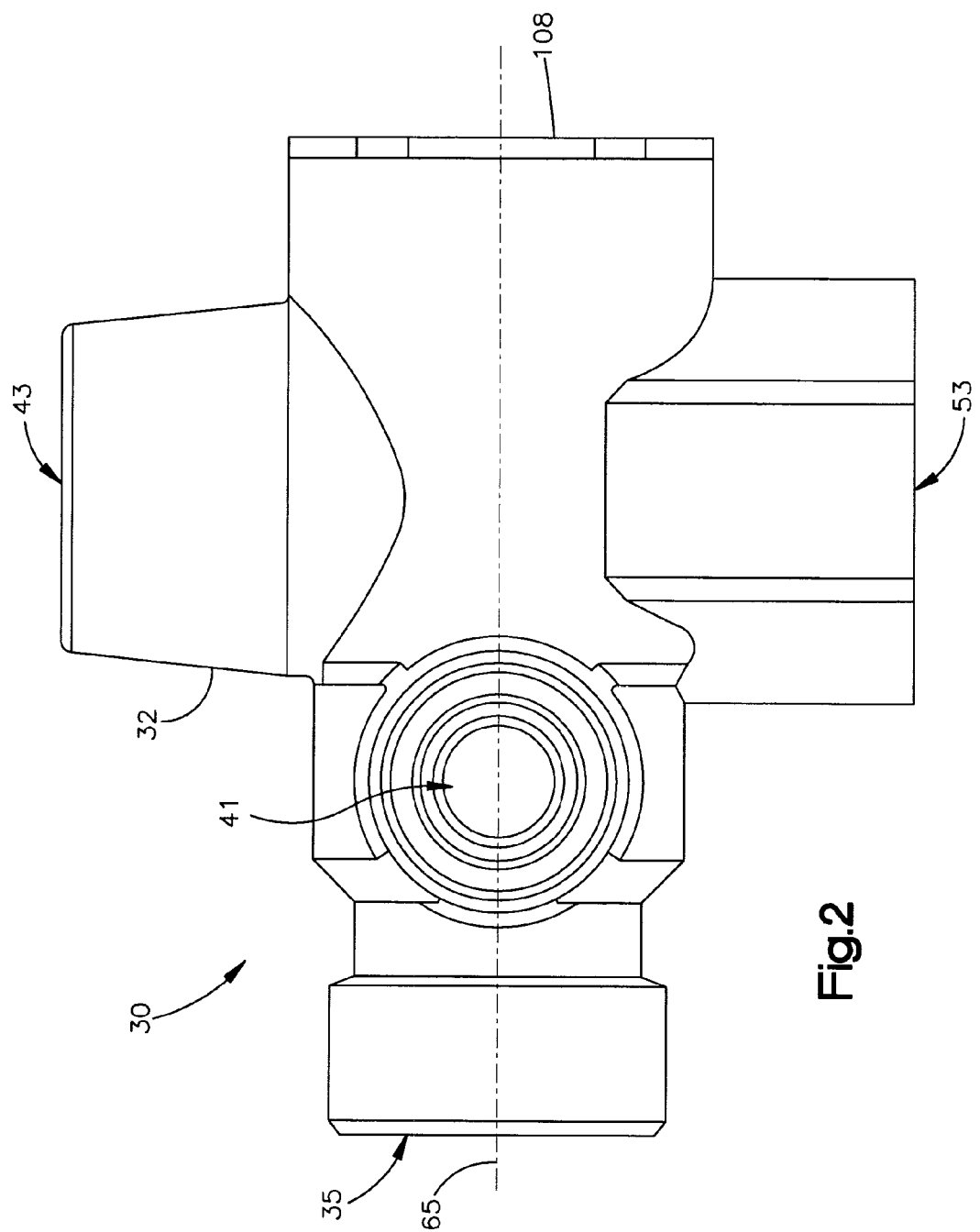
FIG. 2 is a side view of the valve assembly of FIG. 1.
Figure 3:
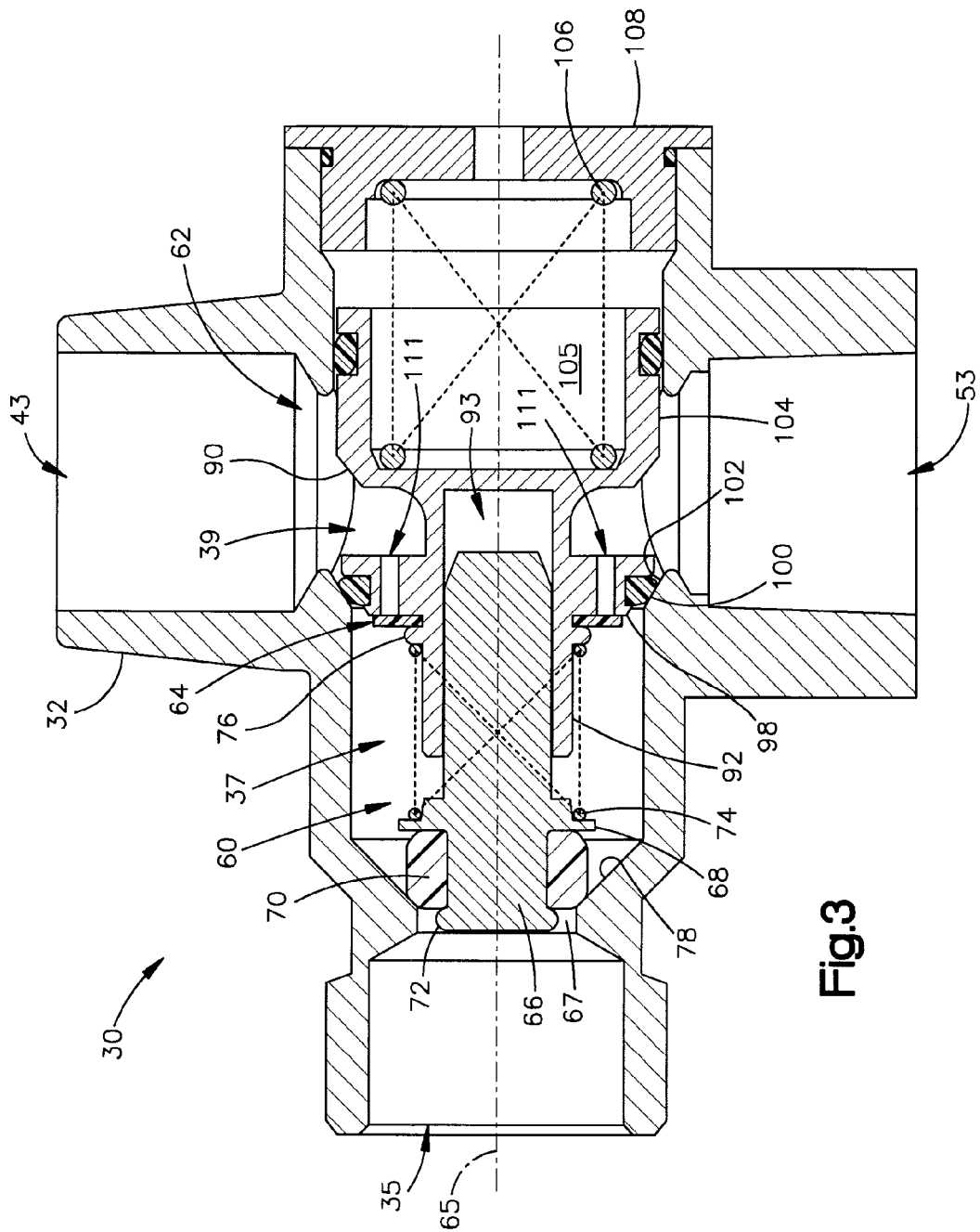
FIG. 3 is a sectional view of the valve assembly as shown in FIG. 2.

As shown in greater detail in FIGS. 2 and 3, the control valve assembly 30 has a housing 32 with ports and chambers. These include an inlet port 35, a first chamber 37, and a second chamber 39. The first chamber 37 has a first outlet port 41 (FIG. 2). The second chamber 39 has a second outlet port 43. The inlet port 35 is configured to receive a coupling 44 (FIG. 1) at the end of a pneumatic line 46 extending from the compressor 20. The first outlet port 41 is configured to receive a coupling 48 on the hose 24. The second outlet port 43 is configured to receive a coupling 50 on a pneumatic line 52 extending to the tank 22.

An open end portion 53 of the second chamber 39 is located opposite the second outlet port 43. That portion 53 of the second chamber 39 is configured to contain a pressure sensor 54, which is shown schematically in FIG. 1. A controller 56 operatively interconnects the sensor 54 with the compressor motor 58.

As further shown schematically in FIG. 1, the valve housing 32 contains valves for controlling the flow of air between the inlet and outlet ports 35, 41 and 43. These include first, second and third check valves 60, 62 and 64. As shown in FIG. 3, the three valves 60, 62 and 64 are centered on a longitudinal central axis 65 of the housing 32.

The first check valve 60 controls the flow of air through an orifice 67 (FIG. 3) between the inlet port 35 and the first chamber 37. Specifically, the first check valve 60 has a piston 66 with a flange 68. An elastomeric sealing ring 70 is captured between the flange 68 and an upset terminal end portion 72 of the piston 66. A spring 74 is compressed axially between the flange 68 and a rib 76 on the second check valve 62. In this arrangement, the spring 74 biases the sealing ring 70 toward a valve seat 78 that surrounds the orifice 67. The first check valve 60 thus has a normally closed condition in which it blocks the flow of air through the orifice 67 from the inlet port 35 to the first chamber 37. When pneumatic pressure at the inlet port 35 reaches a predetermined elevated level, it moves the piston 66 and the sealing ring 70 against the bias of the spring 74, and thus moves the sealing ring 70 axially away from the valve seat 78. This opens the orifice 67 and permits air to flow from the inlet port 35 to the first chamber 37.

The second check valve 62 also has a spring-biased piston 90. An outer end portion 92 of the piston 90 has a counterbore 93 in which the piston 66 at the first check valve 60 slides axially between open and closed positions. A flange 98 on the outer end portion 92 supports an elastomeric sealing ring 100 which, in the closed position of FIG. 3, engages a surrounding valve seat 102 to block the flow of air from the first chamber 37 to the second chamber 39.

An inner end portion 104 of the piston 90 has a counterbore 105 in which a spring 106 is compressed axially between the piston 90 and a closure cap 108 on the housing 32. When pneumatic pressure in the first chamber 37 reaches a predetermined elevated level, it moves the flange 98 and the sealing ring 100 against the bias of the spring 106. The sealing ring 100 then moves off the valve seat 102 to permit a flow of air from the first chamber 37 to the second chamber 39. In this particular embodiment, the second check valve 62 is configured to open under a pressure level of 100 psi, and to close when the pressure drops below 80 psi.

FIG. 3 also shows air flow passages 111 extending axially through the flange 98 on the piston 90 at the second check valve 62. The third check valve 64 is a flapper check valve that controls the flow of air through the passages 111. Configured as washer-shaped elastomeric ring, the valve 64 is mounted on the piston 90 between the rib 76 and the flange 98. It overlies the side of the flange 98 facing the first chamber 37, and covers the passages 111 to block the flow of air through the passages 111 from the first chamber 37 to the second chamber 39. If the pneumatic pressure in the second chamber 39 has a predetermined elevated level, the valve 64 can open by deflecting away from the passages 111. Air can then flow through the passages 111 from the second chamber 39 to the first chamber 37.

In use of the apparatus 10, the user first turns the compressor 20 on. The first check valve 60 opens as the pneumatic pressure at the inlet port 35 reaches the first elevated level nearly immediately. Compressed air then flows through the first chamber 37 and into the hose 24 through the first outlet port 41. This quickly pressurizes the hose 24 sufficiently for the user to inflate a tire even if there is little or no compressed air stored in the tank 22.

When the pressure in the first chamber 37 reaches the second elevated level of 100 psi, the second check valve 62 opens. Compressed air then flows from the first chamber 37 to the second chamber 39, and onward to the tank 22 through the second outlet port 43. The tank 22 then rises toward an elevated storage pressure level. If the user again discharges air from the hose 24 into a tire while the tank 22 is being filled, the pressure in the first chamber 37 will drop. If that pressure drops below 80 psi, the second check valve 62 will close. This enables the compressor 20 to re-pressurize the hose 24, and repeats as needed if the user repeatedly discharges air from the hose 24 before the tank 22 reaches the storage pressure level.

When the tank 22 reaches the storage pressure level, as indicated by the sensor 54, the controller 56 responds by turning the compressor motor 58 off. The first check valve 60 then closes as the pressure at the inlet port 35 drops. The second check valve 62 remains open under the pressure in the first chamber 37. When the user again discharges air from the hose 24, the pressure in the first chamber 37 drops to a level at which the second check valve 62 closes.

However, the third check valve 64 then opens under the storage pressure in the tank 22, and remains open for air to flow from the tank 22 to the hose 24 until the pressure in the tank 22 is drawn down nearly to atmospheric pressure. If the user turns the compressor 20 back on, the hose 24 will again become quickly pressurized to inflate a tire even if there is little or no compressed air remaining in the tank 22.

This written description sets forth the best mode of carrying out the invention, and describes the invention so as to enable a person skilled in the art to make and use the invention, by presenting examples of the elements recited in the claims. The patentable scope of the invention is defined by the claims, and may include other examples that occur to those skilled in the art. Such other examples, which may be available either before or after the application filing date, are intended to be within the scope of the claims if they have elements that do not differ from the literal language of the claims, or if they have equivalent elements with insubstantial differences from the literal language of the claims.

The invention claimed is:

1. An apparatus comprising:
 a valve housing having an inlet port, a first chamber with a first outlet port, and a second chamber with a second outlet port;
 a first valve configured to open a pneumatic flow path from the inlet port to the first chamber in response to a first level of pneumatic pressure at the inlet port;
 a second valve configured to open a pneumatic flow path from the first chamber to the second chamber in response to a second, greater level of pneumatic pressure in the first chamber; and
 a third valve configured to open a pneumatic flow path from the second chamber to the first chamber in response to a third level of pneumatic pressure in the second chamber, with the third level being less than the first level.

2. An apparatus as defined in claim 1 wherein the first, second, and third valves are check valves.

3. An apparatus as defined in claim 2 wherein the first and second valves are spring-loaded check valves, and the third valve is a flapper check valve.

4. An apparatus as defined in claim 1 further comprising a compressor, a sensor responsive to pneumatic pressure in the second chamber, and a controller configured to respond to the sensor by turning the compressor off if the pneumatic pressure in the second chamber reaches a fourth level greater than the second level.

5. An apparatus comprising:
 a valve housing having an inlet port, a first chamber with a first outlet port, and a second chamber with a second outlet port;
 a first spring-loaded check valve configured to open a pneumatic flow path from the inlet port to the first chamber under pneumatic pressure at the inlet port;
 a second spring-loaded check valve configured to open a pneumatic flow path from the first chamber to the second chamber under pneumatic pressure in the first chamber; and
 a flapper check valve configured to open a pneumatic flow path from the second chamber to the first chamber under pneumatic pressure in the second chamber.

6. An apparatus as defined in claim 5 further comprising a compressor, a sensor responsive to pneumatic pressure in the second chamber, and a controller configured to respond to the sensor by turning the compressor off if the pneumatic pressure in the second chamber reaches a predetermined elevated level.

7. An apparatus as defined in claim 6 wherein the first spring-loaded check valve is configured to open under a first level of pneumatic pressure, the second spring-loaded check valve is configured to open under a second level of pneumatic pressure greater than the first level, and the flapper check valve is configured to open under a third level of pneumatic pressure less than the first level.

8. An apparatus comprising:
 a compressor;
 a tank;
 a pneumatic output line;

a first valve configured to open a pneumatic flow path from the compressor to the output line in response to a first level of pneumatic pressure;

a second valve configured to open a pneumatic flow path from the output line to the tank in response to a second, greater level of pneumatic pressure; and a third valve configured to open a pneumatic flow path from the tank to the output line in response to a third level of pneumatic pressure less than the first level.

9. An apparatus as defined in claim 8 wherein the first, second and third valves are check valves.

10. An apparatus as defined in claim 9 wherein the first and second valves are spring-loaded check valves, and the third valve is a flapper check valve.

11. An apparatus as defined in claim 8 further comprising a sensor responsive to pneumatic pressure in the tank, and a controller configured to respond to the sensor by turning the compressor off if the pneumatic pressure in the tank reaches a predetermined storage level greater than the second level.

12. An apparatus comprising:
a compressor;
a tank;
a pneumatic output line;
a valve housing having an inlet port coupled to the compressor to receive compressed air from the compressor, a first chamber with a first outlet port coupled to the output line to provide compressed air to the output line, and a second chamber with a second outlet port coupled to the tank to provide compressed air to the tank;
a first valve configured to open a pneumatic flow path from the inlet port to the first chamber in response to a first level of pneumatic pressure at the inlet port;
a second valve configured to open a pneumatic flow path from the first chamber to the second chamber in response to a second, greater level of pneumatic pressure in the first chamber; and
a third valve configured to open a pneumatic flow path from the second chamber to the first chamber in response to a third level of pneumatic pressure in the second chamber, with the third level being less than the first level.

13. An apparatus as defined in claim 12 wherein the first, second and third valves are check valves.

14. An apparatus as defined in claim 13 wherein the first and second valves are spring-loaded check valves, and the third valve is a flapper check valve.

15. An apparatus as defined in claim 12 further comprising a sensor responsive to pneumatic pressure in the second chamber, and a controller configured to respond to the sensor by turning the compressor off if the pneumatic pressure in the second chamber reaches a fourth level greater than the second level.

16. An apparatus comprising:
a compressor;
a tank;
a pneumatic output line;
a valve housing having an inlet port coupled to the compressor to receive compressed air from the compressor, a first chamber with a first outlet port coupled to the output line to provide compressed air to the output line, and a second chamber with a second outlet port coupled to the tank to provide compressed air to the tank;
a first spring-loaded check valve configured to open a pneumatic flow path from the inlet port to the first chamber under pneumatic pressure at the inlet port;
a second spring-loaded check valve configured to open a pneumatic flow path from the first chamber to the second chamber under pneumatic pressure in the first chamber; and
a flapper check valve configured to open a pneumatic flow path from the second chamber to the first chamber under pneumatic pressure in the second chamber.

17. An apparatus as defined in claim 16 further comprising a sensor responsive to pneumatic pressure in the second chamber, and a controller configured to respond to the sensor by turning the compressor off if the pneumatic pressure in the second chamber reaches a predetermined elevated level.

18. An apparatus as defined in claim 17 wherein the first spring-loaded check valve is configured to open under a first level of pneumatic pressure, the second spring-loaded check valve is configured to open under a second level of pneumatic pressure greater than the first level, and the flapper check valve is configured to open under a third level of pneumatic pressure less than the first level.

* * * * *